FIG. 1.

J. C. POTTER.
AUTOMATIC TURRET LATHE.
APPLICATION FILED MAY 23, 1914.

1,293,913.

Patented Feb. 11, 1919.
6 SHEETS—SHEET 4.

FIG. 4.

WITNESSES:

INVENTOR
James C. Potter
BY
Chas. J. Williamson
ATTORNEY

J. C. POTTER.
AUTOMATIC TURRET LATHE.
APPLICATION FILED MAY 23, 1914.

1,293,913.

Patented Feb. 11, 1919.
6 SHEETS—SHEET 5.

WITNESSES:

INVENTOR
James C. Potter
BY
Chas. J. Williamson
ATTORNEY

UNITED STATES PATENT OFFICE.

JAMES C. POTTER, OF PAWTUCKET, RHODE ISLAND.

AUTOMATIC TURRET-LATHE.

1,293,913.  Specification of Letters Patent.  Patented Feb. 11, 1919.

Application filed May 23, 1914. Serial No. 840,568.

*To all whom it may concern:*

Be it known that I, JAMES C. POTTER, a resident of Pawtucket, in the county of Providence, and in the State of Rhode Island, have invented a certain new and useful Improvement in Automatic Turret-Lathes, and do hereby declare that the following is a full, clear, and exact description thereof.

My invention relates to metal working machines, such, for example, turret lathes of the type which have a revolving chuck spindle and turret and cross slides, whose movements are auomatically controlled, and generally stated my object is to facilitate the chucking or work-placing operation, and to this end my invention consists in the machine constructed substantially as hereinafter specified and claimed.

In the accompanying drawings—

Briefly described, my invention as embodied in a turret lathe, comprehends the employment of a plurality of work spindles carried by a rotating table so that while the tools are operating upon work in the chuck of one spindle, previously finished work may be removed and fresh work placed in an idle spindle, the spindles being successively placed in working, or idle position with reference to the turret slide tools and the cross slide tools, and in the preferred embodiment of my invention the work spindle-carrying table supports the tool spindles vertically and the turret slide is mounted to reciprocate vertically this arrangement facilitating the work of placing work in and removing it from the chucks and economizing floor space. I accordingly illustrate my invention embodied in a machine having the characteristics just noted, and in such embodiment a frame 12 is employed so designed as to provide for the support of a rotating vertical spindle support, or table 13, and a vertically reciprocating turret slide and of the various moving parts of the machine by which the various automatic operations thereof are performed.

In the machine illustrated in the drawings, power is applied to a horizontal driving shaft 14, as by means of a pulley 15 that is belted to a counter shaft, and said driving shaft by suitable trains of gearing supplies the power for revolving the work spindles, putting the various tool slides through their motions, and rotating the spindle table to place the work spindles in and out of operative relation with the tool slides.

On the driving shaft 14 are keyed hand operated gears 16, 17 and 18, respectively, which one at a time may be meshed with gears 19, 20, and 21 on an intermediate shaft 24, each of which last mentioned three gears meshes with appropriate gears 25, 26, and 27 loose upon a shaft 29, and adapted by mechanism forming no part of the present invention to be clutched to said shaft 29 and to revolve the latter at any one of a number of desired speeds according to the requirements of the work as to size and material, for shaft 29 revolves the work spindles when they are in operative relation to the tool slides. Upon the inner end of the shaft 29 is a bevel gear 30 which meshes with a bevel gear 31 on the lower end of a vertical shaft 32 journaled in a bearing 33 on the machine frame, which shaft 32 at its upper end has keyed to it a slidable clutch collar 34 which is vertically movable to place it into, or out of engagement with a clutch collar on each of the spindle-rotating mechanisms with which the machine is provided. The machine shown has two spindles 35 placed diametrically opposite each other in the work table 36, above which each spindle carries its chuck 37. At its underside each chuck has an internal gear 38 with which meshes a pinion 39 upon the upper end of a vertical shaft 40 journaled in a bearing in the rotatable work table, and having at its lower end the clutch collar 41 into and out of mesh with which the clutch collar 34 is movable, when by the rotation of the work table the clutch collar 41 is brought into axial alinement with the clutch collar 34. Thus, a single driving mechanism suffices for all the spindles. The clutch collar 34 is adapted to be actuated by a lever 42 carried by a horizontal rock shaft 43. The ends of the rock shaft 43 project on the outside of the machine frame 10, and upon one of said projecting ends is a treadle 44 for rocking the shaft. On the other end of the shaft 43 is a lever 45 that engages a slidable clutch collar 46 splined to a shaft 47, and which clutch collar is shiftable into and out of engagement with a clutch gear 48 loose on the shaft 47 and meshing with a pinion 49 on a shaft 50. On the shaft 50 is a miter gear 51 which meshes with a miter gear 52 on the lower end of a vertical shaft 53 whose upper end has a miter gear 54 in mesh with a similar gear 55 that is fixed to a spur gear 56 which meshes with a gear 57 loose upon a shaft 58 and which being in mesh with a gear 59 on the main driving shaft 14 is driven at a constant speed. It will thus be seen that the clutch gear 48, which is loose on the shaft 47, is driven at a constant speed from the main driving shaft, and so is the shaft 47, when the clutch 46 is moved into engagement with the clutch gear 48. On the shaft 47 is a worm 60 which meshes with and drives a worm wheel 61 on a stud shaft 62. On its inner face the wheel 61 has a cam 63, which, at one point in its periphery has a notch 64 into which a roller 65 that contacts with the cam and which is carried by a lever 66 on the rock shaft 43, is adapted to fall under the action of a spring 430, acting on the treadle 44 when one revolution of the wheel takes place and the clutch collar 46 is thereby disengaged from the clutch when the revolution of the cam wheel ceases. During the time that the roller 65 is out of the cam notch, the rock shaft 43 is held in the position where the disengagement of the clutch collar 34 with the clutch collar 41 of the spindle revolving shaft 40, is continued, and during this time occurs the revolution of the spindle-carrying table to bring about the exchange of places between the two spindles, so that the just finished work in one spindle chuck may be removed and work newly placed in the other spindle chuck may be placed in position for the performance of work by the tools. When the roller 65 drops into the notch 64, said clutch collar 34 is lifted into engagement with the clutch collar of the spindle revolving shaft 40, and the chuck in working position is revolved.

Preliminary to the revolution of the spindle-carrying table it is shifted horizontally in order to provide room for its revolution without danger of the work striking the cross slide tools and for that reason the bearing of the work table is on a slide 67 which moves on ways 68 on the machine frame 12 from and toward the position of the cross slides. For moving the table carrying slide 67 to and fro, it is provided on its underside at opposite sides with racks 69 with which, respectively, mesh segments 70 on a rock shaft 71 which extends crosswise of the machine frame and to which is keyed a pinion 72 which meshes with a gear 73 on a rock shaft 74. On the outside of the machine frame the rock shaft 74 has fixed to it a lever 75, which, at its free end carries a roller 76 that engages a path cam 77 in the outer face of the worm wheel 61, the path cam 77 having such form as to impart to and fro movement to the spindle table carrying slide and with a dwell or pause through substantially a half revolution of the worm wheel 61 when the spindle table is in its position farthest from the cross slides. The revolution of the spindle table, as has been indicated, takes place when it is in its outward position, and such revolution is automatically produced. The spindle table has a worm wheel 78 with which meshes a worm 79 on a shaft 80. On the shaft 80 is a clutch collar 81 adapted to be engaged by a clutch collar 82 on a slidable shaft 83. The latter has on it a collar 84 against which one end of a coil spring 85 presses, which may be placed under tension by a yoke 86 on a rock shaft 87 mounted in bearing in the table-carrying slide, and which by the outward movement of the latter, through an arm 88 on the rock shaft 87, and a pawl or dog 89 mounted on the machine frame 10, is rocked to move the yoke to increase the tension of the spring 85. It is desired, for the quick throwing of the clutch 82 to employ the spring 85 and premature movement of the clutch 82 is prevented by a pivoted latch 90 which is adapted to engage the collar 84 on the side opposite that on which the spring 85 acts, which latch is released by means of a rod 91 having on it a collar 92 in position to be engaged by a finger 93 on the yoke 86 at the instant it is desired to have the spring act. Such action of the spring takes place immediately following the withdrawal of a vertical latch bolt 94, which, at its upper end engages one at a time two indexing holes 95 in the underside of the rotating table and is yieldingly pressed upward by a coil spring 96 acting upon its lower portion, the releasing movement of the bolt 94 against the action of its spring being produced by a radial finger 97 on the rock shaft 87. The rock shaft 87 being thus utilized to release the latch bolt and to throw the clutch 82, the spring device just described for throwing the clutch 82 enables postponement of the throwing of the clutch 82 until the latch bolt has been moved to release the rotatable table. The shaft 83 which carries the clutch 82 has upon it a spur gear 98 in mesh with a similar gear 99 upon a shaft 100, which is splined to the miter gear 55 so that the shaft 100 may move longitudinally with the table-carrying slide 67 and yet remain connected with the miter gear 55, by which its revolution is produced and as the miter gear 55 receives its motion from the constant speed gear 59, it will be seen that the clutch 82 is driven at a constant speed. When the latch bolt 94 is withdrawn from the index hole 95, and the table is revolved far enough to carry the index hole 95 out of alinement with the bolt, there is nothing to prevent the latch bolt lifting spring 95 from exercising its tendency to move the latch bolt upward against the underside of the table and when the next index hole comes into alinement with the latch bolt 94 the latter is moved upward into said index hole, and by such upward movement through the finger 97 the shaft 87 is rocked and the yoke 86 moved to withdraw the clutch collar 82 out of mesh with the clutch collar 81 on the worm shaft 80 and thus impartation of rotation to the spindle-carrying table is stopped. The yoke 86 acts upon a collar or hub of the gear 98 and the action of the yoke upon the spring 85 to increase its tension is produced through said gear 98. It will be noted that the constant speed gear 59 is the means by which motion is imparted to the spindle table to rotate it and also to the slide 67 to move the work spindles into and out of position for action, and hence, these two movements are certain to take place in proper time relation.

The dog 89 which causes the rocking of the shaft 87 to release the locking bolt 94 and to throw the clutch 82, is spring-held in tripping position so that upon the return movement of the table-carrying slide which carries the arm 80 to the other side of the dog, said dog 88 when engaged by the arm 80 will yield before the latter and pass out of its path.

It is desirable in placing work in a chuck to rotate the chuck before the work is submitted to the action of the tools in order to ascerain whether the work is centered. To enable this to be done when one of the chucks is disconnected from its driving clutch 34, I provide a shiftable friction roller 101 which is carried by a sliding bar 102 that is adapted to be actuated by a hand lever 103 to place the roller in contact with the rims of both chucks at the same time so that the revolution of the chuck by the driving collar 34, when such chuck is in working position, will be transmitted to the other chuck.

It is desired to have the feed of the turret and cross slides in direct proportion to the spindle speeds, and this is accomplished by having a gear connection between the spindle and feed drives. I accomplish this in the present machine by placing upon the shaft 29 a gear 104, which meshes with a gear 105 on a shaft 106, which, through gears similar to those which transmit motion from the driving shaft 13 to the shaft 29, transmit motion to a shaft 107 having upon it a gear 108 that meshes with a gear 109 that runs loose on the shaft 58, but drives the latter through the familiar differential gear 111. The shaft 58 has a miter gear 112 which meshes with a miter gear 113 on a shaft 114 which has a spur gear 115 in mesh with a like gear 116 on a horizontal shaft 117. The shaft 117 drives three vertical shafts, one 118 which transmits motion to the mechanism for operating the turret slide 119, and two others 120, which, respectively, transmit motion to the mechanism for operating the cross slides 121. The connection between each of said shafts and the turret slide and the cross slide operating mechanism, as the case may be, is produced in each instance by a cyclometer mechanism 122, shown in Figs. 7 to 12, such as that which forms the subject of the application of Myron S. Curtis, No. 728,139, filed Oct. 28, 1912, and, therefore, not requiring to be described herein, but I do not limit myself only to that particular mechanism, although, by reason of its compactness, and the indefinite travel of the turret slide which is possible therefrom, it is desirable for a vertical machine. The turret slide carries a circular series of tools and it is automatically rotated step by step to place the tools successively in position for action upon the same piece of work in a chuck; and as each of the cross slides has its own operating mechanism, it will, therefore, be seen that by my invention I have all the characteristics and capacities of the automatic turret lathe, but with the important advantages accruing from the vertical reciprocation of the turret slide.

Keyed to the shaft 58 is a clutch collar 123 with which may be engaged a clutch collar 124 on the gear 57, and when so engaged the shaft 58 will be revolved at a higher rate of speed than that imparted to it by the differential gear 111, such higher rate of speed being possible by the usual ratchet in the differential gear, and being that at which the constant speed gear is run for the quick return, or idle motions of the turret slide.

The shaft 114 has a worm 125 which meshes with a worm wheel 126 on a shaft 127 which carries a dog wheel 128 adapted to support the various dogs by which the automatic changes of speed and feed are effected, as for example, in the case of the speed changes by means of a lever 129 which at one end is in the path of the dogs and is connected by a link 130 to a yoke 131 that actuates a friction clutch 132, to alternately clutch the gears 26 or 27 to the shaft 29, or unclutch both therefrom, in which case gear 25 through a well-known automatic roll clutch drives the shaft 29. In the case of the feed changes similar means may be employed to change the speed of the shaft 107. On the latter are three gears 133, 134 and 135. Either of the gears 133 and 134 may be clutched to the shaft 107, by a friction clutch 136 having a yoke 137 which is connected by a link 138 with a lever 139 that is rocked by the dog wheel 128, and when the clutch is in a neutral position the gear 135 is automatically clutched to the shaft 107, by an automatic roll clutch. The gears 133, 134 and 135, mesh respectively with gears 140, 141 and 142, on a shaft 143. On the outer end of the shaft 143 is keyed a gear 144 which meshes with change gears 145 on the shaft 106. Also on the shaft 106 is splined a slidable sleeve 146, carrying three gears, two of which 147 and 148, are adapted one at a time to mesh with the gears 141 and 142, respectively, and the third sleeve gear 149 is adapted to mesh with a gear 150 on the shaft 143. Thus, by these various hand change gears, many additional changes of feed may be produced.

The turret slide 119 is counterbalanced by a weight 151 and the cross slides are mounted upon vertically shiftable beds 152.

The cyclometer mechanism for producing the movement of the turret and cross slides, is shown in detail in Figs. 7 to 12. Each of the three vertical shafts 118 and 120, has a bevel gear 153 which meshes with a bevel gear 154 on a shaft 155 mounted in bearings in a casing 156. On the shaft 155 are two gears 157 and 158, which respectively mesh with gears 159 and 160 loose upon a shaft 161, to which is splined a clutch collar 162, situated between the two gears 160 and 161, and adapted to occupy the neutral position shown in Fig. 8, or be shifted into engagement with either of said gears 160 and 161, and hence be revolved and the shaft 161 thereby revolved and its revolution is in opposite directions because between the gears 157 and 159 there is an intermediate gear 163. On the shaft 161 is a gear 164 by which motion is directly imparted to the turret or cross slide, as the case may be. For shifting the clutch 162 whose position determines whether or not the turret and respective cross slides shall be operated in the direction of movement, said clutch collar is engaged by a yoke 165 which is carried by a sliding bar 166 having a roller 167 engaged by a path cam 168 on the shaft 169. The shaft 169 is adapted to receive motion intermittently from the Geneva stop mechanism shown, which includes the coöperating disk members 170 on the shaft 155 and 171 on the cam shaft 169. The disk member 170 carries a slidable pin 172, which at predetermined times is projected to engage the cooperating disk member 171 and cause the turning of the latter and the cam 168 so long as the engagement exists. For projecting the pin 172 to engage the disk 171, a wheel 173 is provided that has a series of holes 174 for the reception of pins 175 which are set in the hole according to the time it is desired to have the clutch cam 168 operate. The wheel 173 is a gear wheel which meshes with a pinion 176 on shaft 177 which carries the pinion 178 which periodically is engaged by the teeth 179 of the disk 170.

Figure 1:
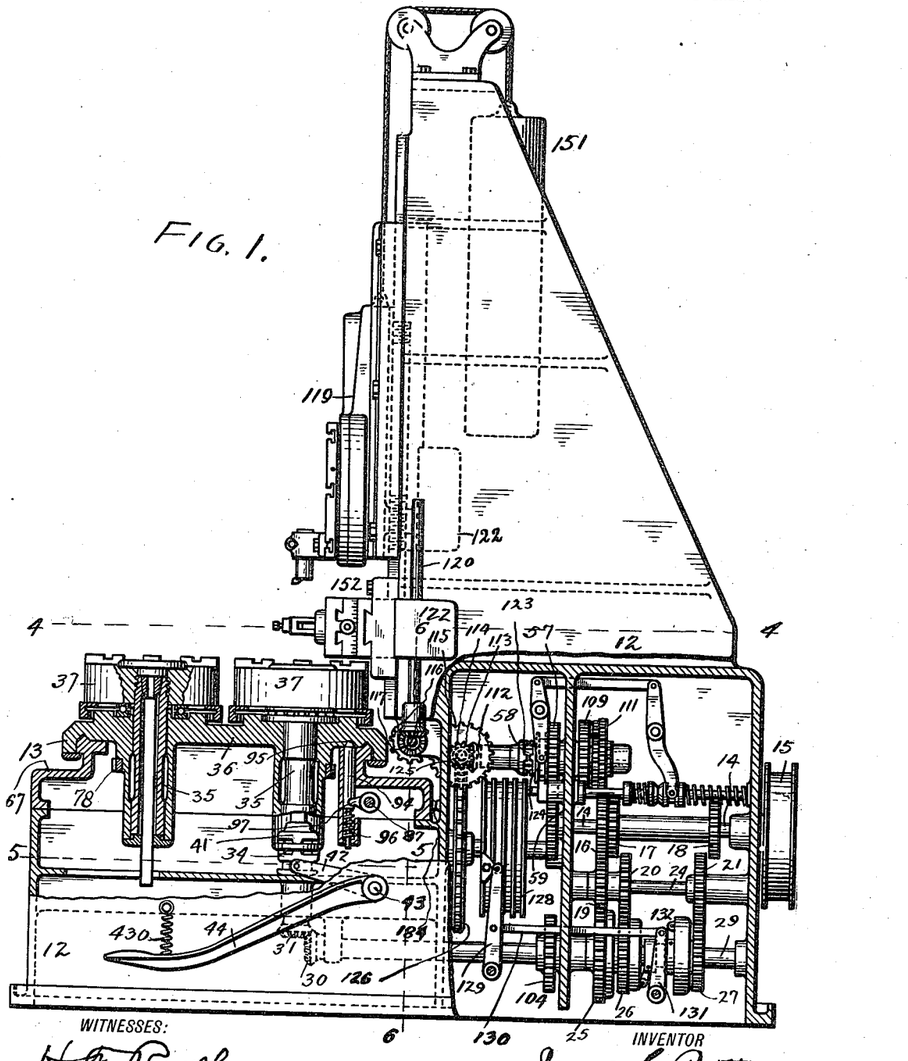
Figure 1 is a vertical section with parts in side elevation of a turret lathe embodying my invention.
Figure 2:
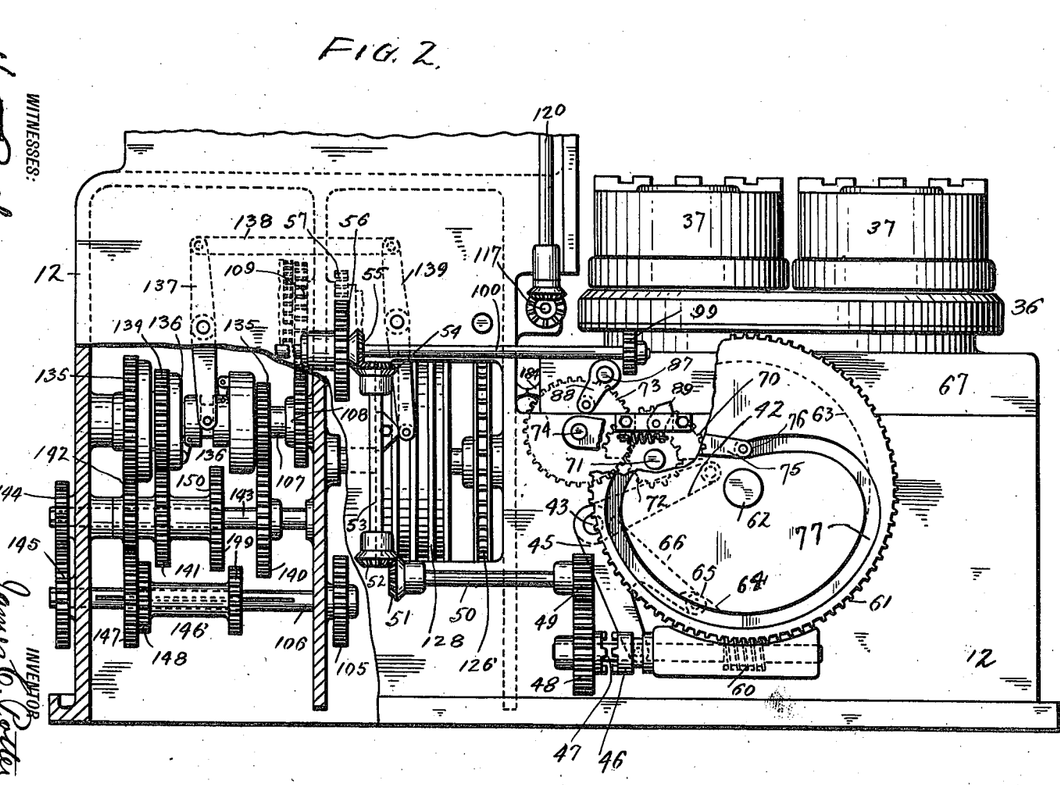
Fig. 2 is a similar view looking from the opposite side.
Figure 3:
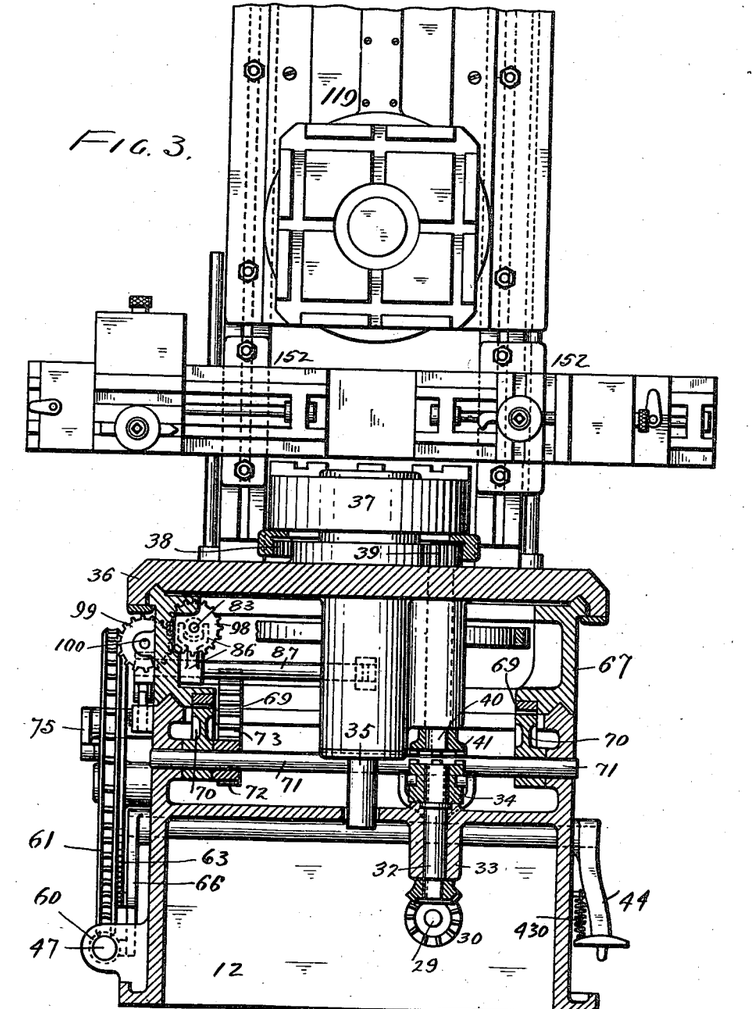
Fig. 3 is a front elevation.
Figure 4:
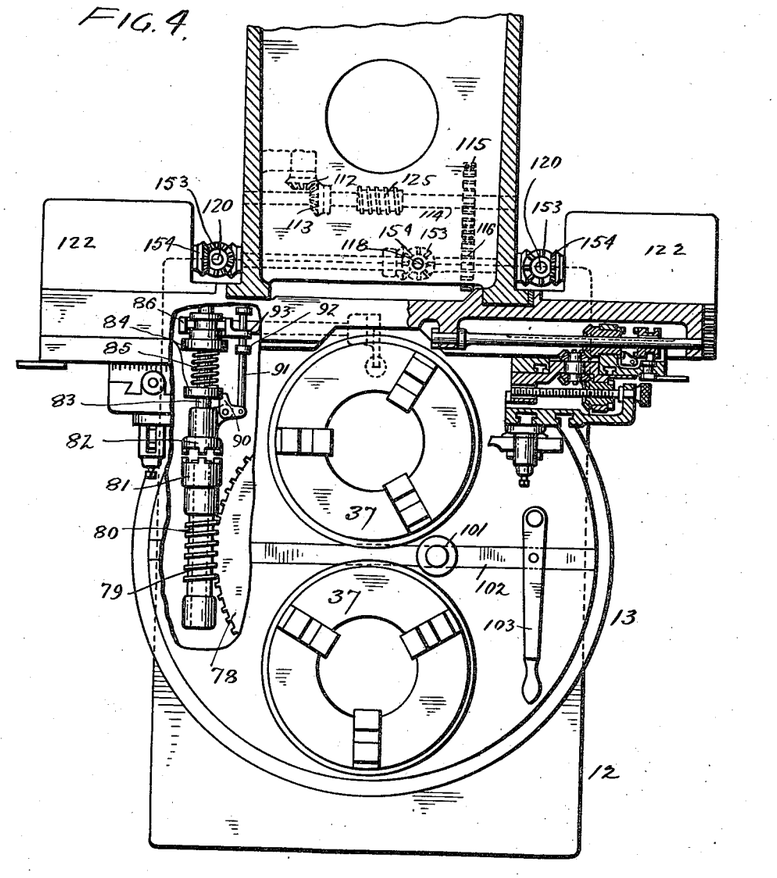
Fig. 4 is a horizontal section on the line 4—4 of Fig. 1.
Figure 5:
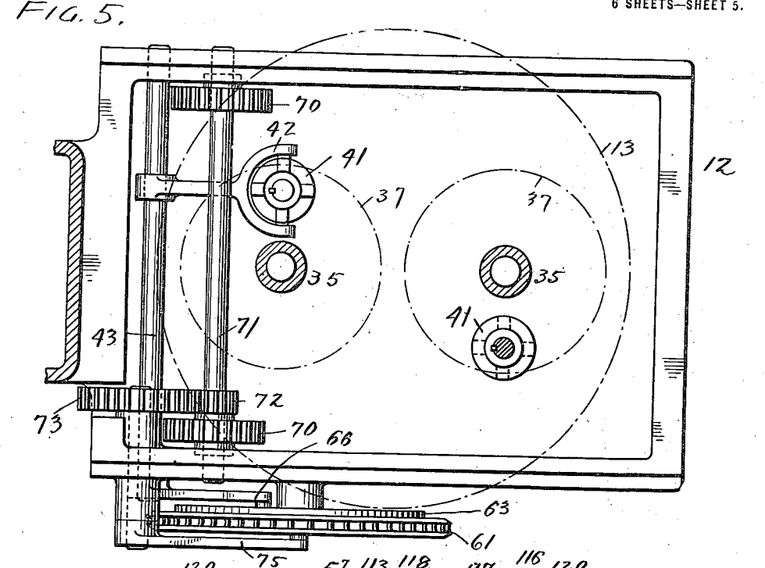
Fig. 5 is a horizontal section on the line 5—5 of Fig. 1.
Figure 6:
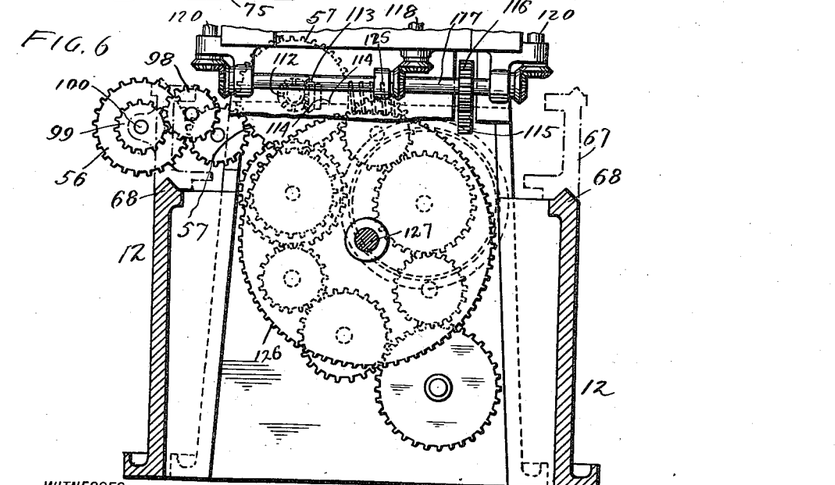
Fig. 6 is a vertical section on the line 6—6 of Fig. 1.
Figure 7:
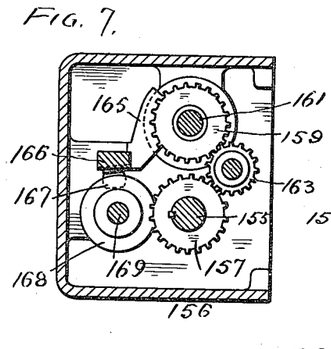
Figs. 7 to 12 are detail views of the cyclometer mechanism for producing the movements of the turret and cross slides.
Figure 8:
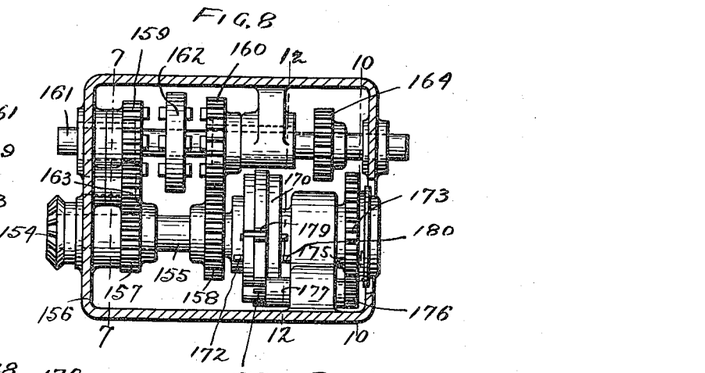
Figure 9:
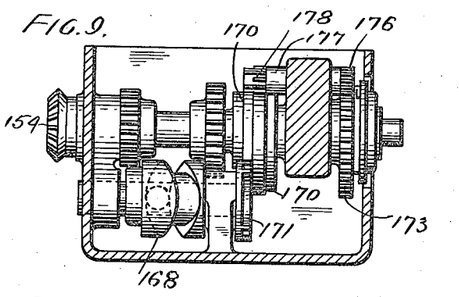
Figure 10:
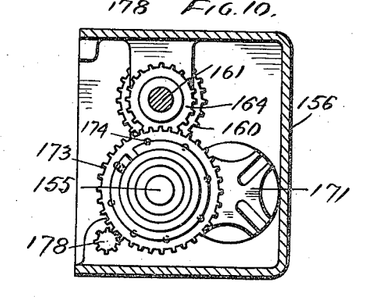
Figure 11:
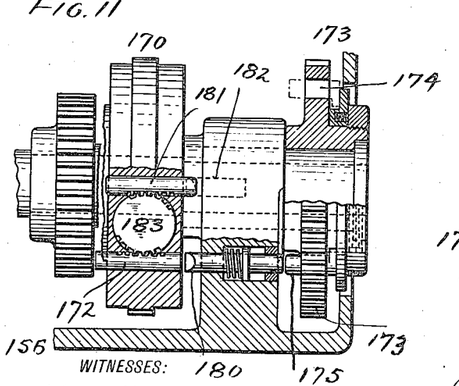
Figure 12:
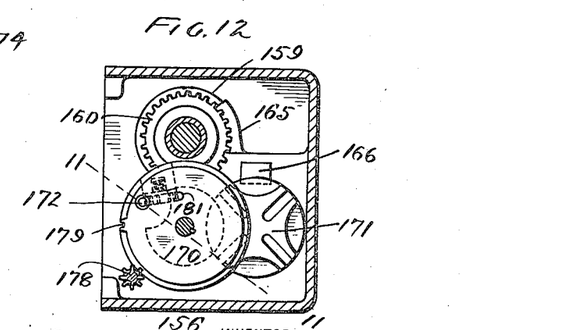

In the path of the pin 175 is the end of a sliding pin 180 which, when engaged by a pin 175 is moved longitudinally and engaging the pin 172 projects it from the member 170 in position to engage the member 171. After the pin 180 is moved by the pin 175, the latter passes out of contact with it and a spring returns the pin 180 to its former position. As shown in Fig. 11 the retracting spring for the pin 180 is a coil spring that bears at one end upon a flange, or collar on said pin. The retraction of the pin 172 is effected by automatically providing a sliding pin 181 which in the rotation of the disk 170 encounters a stationary pin or stud 182 and is moved longitudinally the motion being transmitted from the pin 181 to the pin 172 by an intermediate gear 183.

In the use of the machine shown, while the cutting tools are at work upon a piece in the working chuck, the workman places a fresh piece in the idle spindle; and by depressing the treadle he rocks the shaft 43 and simultaneously disengages the spindle driving clutch 34; throws the clutch 46 into engagement with the clutch gear 48, and lifts the roller 65 out of the cam notch 64, whereupon the cam wheel 61 begins to revolve. By its revolution, the lever 75 is swung and the rock shaft 74 is turned, and through the gears 72 and 73 the shaft 71 is rocked and by the gear segments 70 and racks 69 the slide 67 is moved outward until the lever roll 76 reaches the circular portion of the path cam 77, whereupon outward movement ceases and the slide is stationary for about a half revolution of the cam wheel. During the outward travel of the slide 67, the rock shaft arm 88 is moved by its contact with the dog 89, and the shaft 87 is rocked to release the latch bolt 96, and to throw the clutch collar 82 into engagement with the clutch collar 81 of the table rotating worm shaft 80 and such engagement continues until the next index hole alines with the latch bolt. The slide 67 is held by the frame of the path cam 77 sufficiently far from the tools as to enable the half revolution of the spindle table to cause the two chucks to exchange places without striking the tools and its form might be such as to cause all, or practically all of the half rotation to take place while the rotatable table is in its outward position, or such rotation may take place during the reciprocation of the slide, the important consideration being the avoidance of the turning movement while there is danger of the work colliding with the tools. The return of the slide 67 to its inner position, being accomplished on the complete revolution of the cam wheel, the notch 64 is again brought opposite the lever roll 64 and the latter entering said notch the rock shaft 43 is free to turn in the direction to cause the lever 47 to throw the clutch 46 to stop the cam wheel turning shaft 47 whereupon the slide 67 comes to rest, abutting against a stop 184 on the frame 12, (which stop may be adjustable) and held in such position by the resting of the lever roll 76 in a land or dwell, in the path cam. Before the return travel of the slide 67 begins, and upon the completion of the half revolution of the spindle table, the latch bolt spring throws the latch bolt into the alining index hole, and rocks the shaft 87 to disconnect the clutch members 81 and 82 of the table rotating mechanism.

It is to be understood that the embodiment of my invention shown and described herein, is not the only form it may be given, and, hence, other forms may be resorted to without departure from the spirit thereof as is set forth in the claims.

Having thus described my invention what I claim is—

1. In a metal working machine, the combination of a plurality of work holders, a rotatable table carrying them, automatic table rotating means, a tool slide, said table, together with the work holders, being shiftable to and from the tool slide and means to shift said table to and from working position relative to the tool slide.

2. In a metal working machine, the combination of a plurality of work holders, a rotatable table carrying them, automatic table rotating means, a horizontally movable slide supporting said table to rotate on a vertical axis, automatic means to control the movements of said slide, and a vertically movable tool slide.

3. In a metal working machine, the combination of a plurality of revoluble work spindles, a tool slide, a movable support for the spindles, by which they are successively moved to and from working position, spindle rotating mechanism with which the work spindles are operatively connected one at a time. A slide carrying the spindle support, means for shifting said slide to change the position of the work spindles with reference to the tool slide, and a clutch for connecting the spindle rotating mechanism and the work spindles, said clutch comprising a stationarily mounted member, and a member supported and carried by said slide.

4. In a metal working machine, the combination of a plurality of revoluble work spindles; a tool slide, a rotatable support for the spindles, by which they are successively moved to and from working position, spindle rotating mechanism with which the work spindles are operatively connected one at a time, a slide carrying said rotatable support, automatic means to reciprocate said slide, and to stop its movement when a spindle is presented in working relation to the tool slide, and automatic means to control the connection of the spindle-rotating mechanism with each spindle.

5. In a metal working machine, the combination of a driving shaft, a tool slide, a plurality of work spindles, a rotatable table carrying said spindles, a feed shaft, a constant speed feed shaft gear, an operative connection between the feed shaft and the tool slide, a controllable gear connection between the constant speed gear and the rotatable table, a gear connection between the drive shaft and the constant speed gear, and a controllable gear connection between the drive shaft and the work spindles.

6. In a metal working machine, the combination of a driving shaft, a tool slide, a plurality of work spindles, a rotatable table carrying said spindles, a constant speed feed shaft, a gear, operative connection between the feed shaft and the tool slide, a controllable gear connection between the constant speed gear and the rotatable table, a gear connection between the drive shaft and the constant speed gear, a slide carrying the rotatable table, a gear connection between said slide and the constant speed shaft, and a controllable gear connection between the drive shaft and the work spindles.

7. In a metal working machine, the combination of a tool holder, a plurality of rotatable work-holders presentable in succession in working relation to the tool holder, and a table forming a common support for said work-holders and with which they are simultaneously shiftable toward and from the tool-holder in a straight-line direction crosswise of the axes of rotation of the work holders.

8. In a metal working machine the combination of a tool holder, a plurality of rotatable work-holders, a rotatable table carrying the latter, by the rotation of which they are brought in succession into working relation with the tool-holder, and a slide supporting said table reciprocable toward and from the tool-holder in a straight-line direction crosswise of the axes of rotation of the work holders.

9. In a metal working machine, the combination of a tool slide, a plurality of work spindles, a traveling support for said spindles, and spindle-rotating mechanism comprising for each spindle a shaft mounted on and moving with the traveling support, said shaft having a clutch member, a slide upon which the spindle support is mounted, said slide being shiftable to and from the tool slide, and a stationarily supported clutch member adapted to engage the shaft clutch members one at a time.

10. In a metal working machine, the combination of a plurality of work spindles, a vertically reciprocating revoluble tool-carrying turret, a rotatable table for the spindles by which they are shifted in succession into and out of working relation to the turret, a slide supporting said table, and means to reciprocate the slide.

11. In a metal working machine, the combination of a tool slide, a plurality of work spindles, a traveling support for said spindles by which they are moved to and from position for work, spindle-rotating means, a rotating element that controls the spindle rotating mechanism and the movements of the traveling support, a constant speed rotating member, means for connecting said constant speed member with the tool slide, and means for connecting said constant speed member with said rotating element.

12. In a metal working machine, the combination of a tool slide, a plurality of work spindles, a traveling support for said spindles by which they are moved to and from position for work, spindle-rotating means, a cam wheel, a clutch that controls the spindle-rotating mechanism actuated by said cam wheel, means for actuating said support by said cam wheel, a constant speed rotating member, means for connecting said constant speed member with the tool slide, and means for connecting said constant speed member with said cam wheel.

13. In a metal working machine, the combination of a plurality of work spindles, a traveling support by which such spindles are placed successively in and out of position for the performance of work, means for rotating the spindle that is in position for work, and means for temporarily rotating a spindle that is out of position for work.

14. In a metal working machine, the combination of a plurality of work spindles, a traveling support by which such spindles are placed successively in and out of position for the performance of work, means for rotating the spindle that is in position for work, and means for temporarily rotating a spindle that is out of position for work, comprising a shiftable power transmitting medium that receives motion from the spindle that is in working position.

In testimony that I claim the foregoing I have hereunto set my hand.

JAMES C. POTTER.

Witnesses:
MITCHELL ADAMS,
ELVERY LINGARD.